July 6, 1943.  J. W. DAWSON  2,323,650
ELECTRIC DISCHARGE APPARATUS
Filed May 7, 1938    2 Sheets—Sheet 2

WITNESSES:
Leon M. Garman
Hymen Diamond

INVENTOR
John W. Dawson.
BY
F. W. Lyle.
ATTORNEY

Patented July 6, 1943

2,323,650

UNITED STATES PATENT OFFICE 2,323,650

ELECTRIC DISCHARGE APPARATUS

John W. Dawson, Auburndale, Mass., assignor to Westinghouse Electric & Manufacturing Company, East Pittsburgh, Pa., a corporation of Pennsylvania Application May 7, 1938, Serial No. 206,641

23 Claims. (Cl. 175—363)

My invention relates to electric discharge apparatus and has particular relation to control apparatus for electric discharge devices.

The invention is an outgrowth of developments which I carried out in connection with the testing of transmission cables for faulty regions. Faults are detected in cables by impressing a high periodic potential between the cable and ground. The potential is ordinarily impressed from an alternating current source through a full wave rectifying system in which rectifiers of the gaseous type having control electrodes are utilized. The rectifiers are periodically rendered conductive for an interval measured by a number of half cycles of the source and non-conductive for a similarly measured interval. In actual practice the rectifiers are successively rendered conductive and non-conductive for half second intervals.

When the impulses transmitted through the rectifiers are impressed on the cable discharges are produced at the point at which the cable has failed. The point of failure may be precisely located by making observations at a number of suitably disposed stations and noting at what two stations reversal of the current produced by the discharge through the fault takes place.

A high potential of the order of 10,000 volts must be impressed on the cable to produce the desired current flow because when a cable fails, it burns itself free of the insulation and an arc discharge must be initiated between the cable and ground. The high potential which is used raises certain problems as regards the rectifiers. If the current passed by the rectifiers when they are subjected to the high potential is relatively large, the cathodes of the rectifiers are destroyed.

In accordance with the teachings of the prior art, the conductivity of the rectifiers is timed by impressing between their control electrodes and their cathodes alternating potentials derived from the main source. The periodicity of the conductivity of the rectifiers is in the prior art apparatus, attained preferably by closing and opening the secondary circuits of the transformers whereby the control potential is supplied. This arrangement, however, has not proved itself altogether satisfactory. One terminal of each of the secondaries of the control transformers is necessarily connected to the cathode of the associated rectifier. Since the cathode of the rectifiers is at a high potential the mechanism whereby the secondary circuits are closed and opened is in some way connected to the high potential terminal and the problem of insulating the high potential secondaries presents difficulties. Moreover, for proper operation the control circuits must be closed and opened simultaneously and since the rectifiers are ordinarily connected in a Graetz circuit and are four in number, there is a switching problem of some magnitude. Finally, the most important difficulty which has been found to exist is the mysterious failures of the rectifiers utilized in the apparatus after a few hours of operation. An exhaustive analysis of the apparatus has revealed that this difficulty may arise from the irregularity of the application of the control potentials to the rectifiers.

It is accordingly an object of my invention to provide a system of simple structure by controlling the simultaneous ignition of a plurality of gaseous electric discharge devices subjected to a high potential anode cathode potential.

Another object of my invention is to eliminate switching and insulating difficulties in a system incorporating a plurality of electric discharge devices subjected to a high anode cathode potential that are to be rendered conductive in a predetermined time sequence.

A further object of my invention is to provide an arrangement incorporating an electric discharge device of the gaseous type, which is rendered conductive at intervals, wherein the conductivity of the discharge device shall be so controlled that it shall not be destroyed in a short space of time by reason of irregularities arising in rendering it conductive.

Still another object of my invention is to provide a control system for an electric discharge device, that is abruptly rendered conductive at intervals, by the operation of which the discharge device shall be rendered conductive regularly so as to avoid unexpected deleterious effects.

A still further object of my invention is to provide a control system for a gaseous electric discharge device, that is subjected to a high potential of the order of 10,000 volts from an alternating source, by the operation of which the discharge device shall be rendered conductive at precisely predetermined instants in the half periods of the source to eliminate any deleterious effects on the discharge device.

An ancillary object of my invention is to provide a contrivance for suppressing transient effects in a transformer that is to supply potential intermittently.

Another ancillary object of my invention is to provide a transformer of simple structure for supplying varying control potential to a plurality of electric discharge devices.

A further ancillary object of my invention is to provide a transformer raising no difficult insulation problems for supplying control potential to a plurality of discharge devices subject to a high anode-cathode potential.

More specifically stated, it is an object of my invention to provide a system of simple and tractable structure for supplying impulses of current at short intervals which shall function in such manner that the impulses shall be of substantially uniform magnitude throughout.

My invention arises from the realization that the difficulties encountered in the prior art apparatus from the irregularity in the application of control potential are caused by transients produced when the secondaries of the control transformer are closed and opened. The transients cause energizing impulses to be impressed on the rectifiers irregularly in the half periods of the alternating source. The energizing transient impulses are at times impressed early in the half periods and render the rectifiers conductive prematurely, thus subjecting the rectifiers to relatively heavy current.

According to my invention I suppress the transients. This object is accomplished by maintaining the secondary circuits of the control transformer normally closed. At the same time the secondary potential of the control transformer is, except when the rectifiers are to be rendered conductive, maintained at a relatively small value by a short circuited winding on the transformer core, and preferably on the secondary leg. To increase the secondary potential of the control transformer the short circuited winding is simply open circuited. The change in flux in the core of the transformer produced by open circuiting the winding is so negligible that the transient effect is for all practical purposes suppressed.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
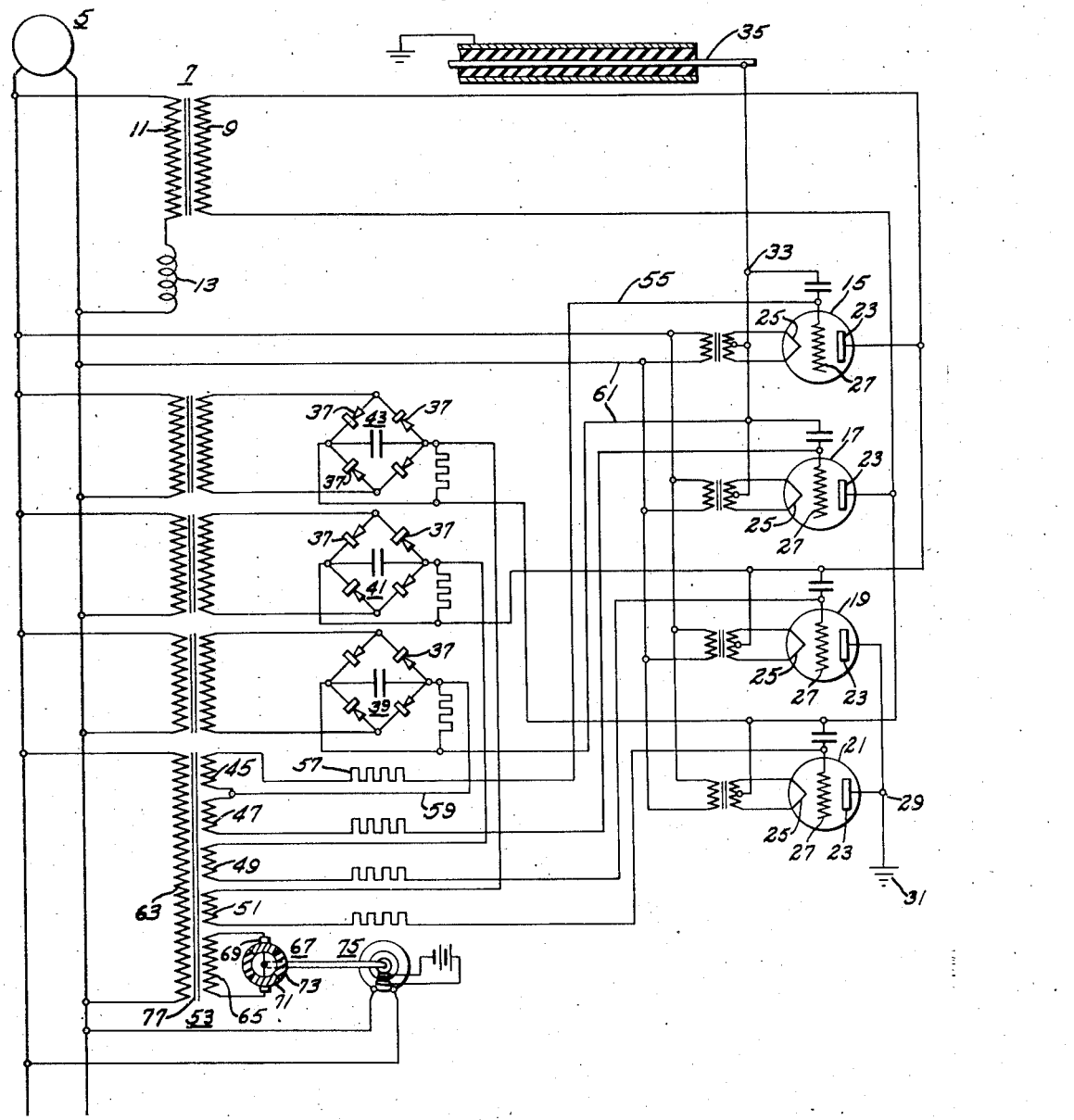
Figure 1 is a diagrammatic view showing a preferred embodiment of my invention.

The apparatus shown in Fig. 1 comprises an alternating current source 5 of the usual commercial 60 cycle type located at electrical substations from which a transformer 7 having a high potential secondary winding 9 is supplied. The primary 11 of the transformer 5 is connected to the source through a reactor 13 which prevents the transformer 7 and the source 5 from being damaged by reason of the short circuiting of the secondary 9. The secondary 9 of the transformer 5 supplies a rectifier system consisting of four arc-like discharge rectifiers 15, 17, 19 and 21 connected in a Graetz circuit. Each rectifier comprises an anode 23, a coated filament 25 of the usual type and a control electrode 27 and a gaseous medium. The low potential terminal 29 of the rectifier system is connected directly to ground 31 while the high potential terminal 33 is connected directly to the cable 35 to be tested.

Each of the discharge devices 15 to 21 of the rectifier system is supplied with a composite control potential consisting of a negative direct current component and an intermittently applied alternating current component. The direct current components are provided from the main source 5 through systems of dry rectifiers 37 connected in Graetz circuits 39, 41 and 43 while the alternating current components are supplied from corresponding secondary windings 45, 47, 49 and 51 of a control transformer 53. The control circuit of the upper discharge rectifier 15 extends from its control electrode 27 through a conductor 55, a resistor 57 the upper winding 45 of the control transformer 53, a conductor 59, the lowermost dry rectifier system 39, a conductor 61 to the cathode 25 of the rectifier 15. The control circuits for the other discharge devices may be traced in a similar manner.

The negative control potential supplied by the rectifier bridges 39, 41 and 43 is sufficient to maintain the discharge devices 15, 17, 19 and 21 non-conductive unless the alternating component superimposed from the control transformer 53 is of substantial positive magnitude.

The primary 63 of the control transformer 53 is directly and permanently connected across the terminals of the main source 5 and secondaries 45, 47, 49 and 51 are also permanently connected in the control circuit of the discharge devices 15, 17, 19 and 21 respectively. However, when the discharge devices 15 to 21 are to be non-conductive, the potential output of the secondaries 45 to 51 of the transformer 53 is maintained at a low value by short circuiting auxiliary winding 65 associated with the secondaries 45 to 51. When the auxiliary winding 65 is open circuited, the output potential of the secondaries 45 to 51 is increased and counteracts the biasing potential supplied by the dry rectifier systems 39 to 43 to render the discharge devices 15 to 21 conductive and to cause current to be supplied to the cable 35.

The desired periodicity of the conductivity and non-conductivity of the discharge rectifier system is attained by rotating a commutator 67 in contact with brushes 69 connected to the terminals of the auxiliary winding 65. The commutator 67 is provided with alternate conducting and insulating segments 71 and 73 and periodically short circuits and open circuits the winding 65. A synchronous motor 75 is provided for rotating the commutator 67 to attain the desired regularity in the timing of the condition of the winding 65. Since it is desirable that the discharge devices 15, 17, 19 and 21 be rendered conductively precisely at a predetermined instant in the half periods of the source, the control transformer 53 is of the impulsing type and is provided with a saturating core 77 of the usual impulsing type.

Figure 2:
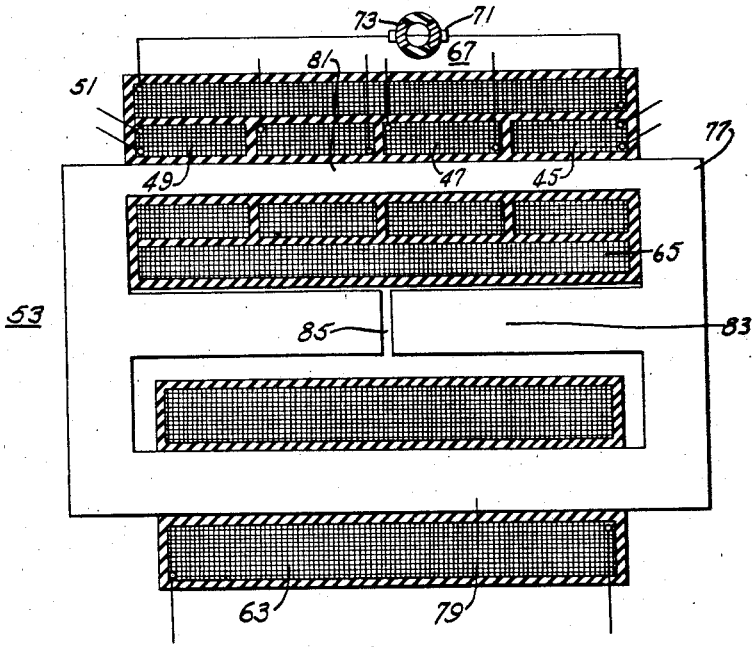
Fig. 2 is a diagrammatic view showing a transformer constructed in accordance with my invention.

The specific structure of the transformer is shown in Fig. 2. It comprises the core 77 which has a leg 79 of predetermined cross sectional area, another leg 81 of considerably smaller cross sectional area and a third leg 83 which is split near its central portion by an air gap 85. The primary 63 of the transformer 53 is wound on the first leg 79 and the secondaries 45, 47, 49 and 51 of the transformer and the auxiliary winding 65 are wound on the small cross-sectional-area leg 81. A transformer 53 of the type described hereinabove supplies a relatively low secondary potential when the auxiliary winding 65 is short circuited and a relatively high potential of peaked wave form when the winding 65 is open circuited.

Figure 3:
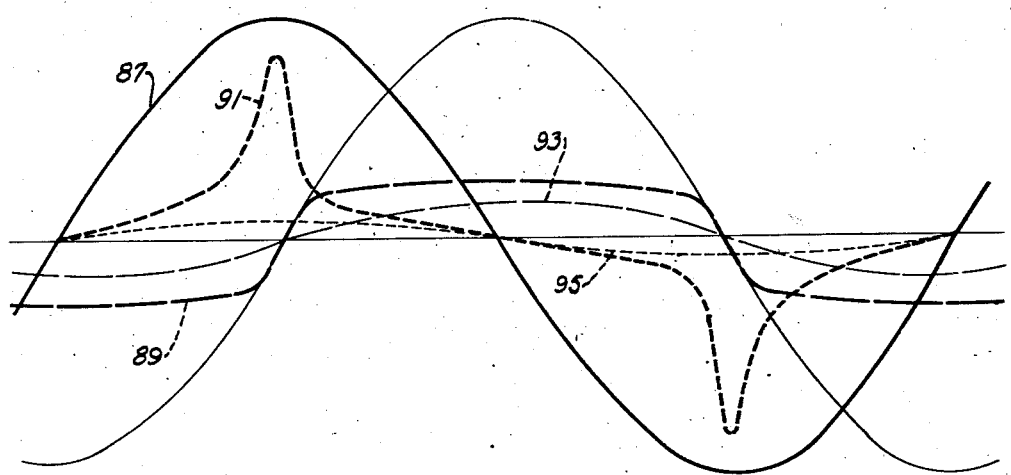
Fig. 3 is a graph illustrating the operation of my invention.

The relationship of the electrical quantities involved in the transformer 53 is graphically illustrated in Fig. 3. In this view time is plotted as abscissa and potential or flux density as abscissa. The heavy sine wave curve 87 represents the primary potential impressed on the transformer 53. The heavy broken-line curve 89 represents the flux density in the small cross sectional area leg 81 of the transformer 53 when the auxiliary winding 65 is open circuited and the heavy dotted-line peaked curve 91 represents the potential output of each of the secondaries of the transformer. The light broken-line curve 93 on the other hand represents the flux density in the secondary leg 81 of the transformer 53 when the auxiliary winding 65 is short circuited. The corresponding secondary potential is represented by the light dotted curve 95. It is seen that the latter potential as shown is relatively small. Further, it is to be noted that the impulses of potential produced at the terminals of the secondaries 45, 47, 49 and 51 of the transformer when the auxiliary winding 65 is open circuited occur at precisely the same point as the maxima of the half waves of the primary potential. The discharge devices of the rectifier are, therefore, rendered conductive precisely at points lagging the zero points of the waves of the source by 90°.

In addition to assuring that the rectifiers 15, 17, 19 and 21 are rendered conductive at precise instants in the half periods of the source 5, the arrangement according to my invention also solves the mechanical switching problem and the insulating problem. Only a single switching arrangement 67 is needed to control the four discharge devices 15 to 21. Moreover, since the impulse windings 45 to 51 need not be connected and disconnected, they may be permanently insulated for high voltage.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. A transformer comprising a core having a leg of a predetermined cross-sectional area, a leg of substantially smaller cross-sectional area and a leg interrupted by an air gap, input winding means wound on said first-mentioned leg, output winding means and a normally short-circuited winding wound on said second mentioned leg and means for opening the short circuit of said winding when the potential of said output winding means is to be substantial.

2. In combination an electric discharge device having a control electrode and a plurality of principal electrodes, a transformer comprising a magnetizable core, primary winding means and secondary winding means, means for impressing an alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

3. In combination an electric discharge device having a control electrode and a plurality of principal electrodes, means for impressing an alternating potential between said principal electrodes, a transformer comprising a magnetizable core, primary winding means and secondary winding means, means for impressing an alternating potential in synchronism with said first mentioned alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

4. In combination an electric discharge device having a control electrode and a plurality of principal electrodes, a transformer having a readily saturable core and comprising primary winding means and secondary winding means, means for impressing an alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

5. In combination an electric discharge device having a control electrode and a plurality of principal electrodes, means for impressing an alternating potential between said principal electrodes, a transformer having a readily saturable core and comprising primary winding means and secondary winding means, means for impressing an alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

6. In combination an electric discharge device having a control electrode and a plurality of principal electrodes a transformer comprising a magnetizable core, primary winding means and secondary winding means, means for impressing an alternating potential on said primary winding means, means for connecting said secondary winding means between said control electrode and one of said principal electrodes, an auxiliary winding on said transformer and means for periodically short circuiting and open circuiting said auxiliary winding to vary periodically the potential impressed between said control electrode and said one principal electrode.

7. In combination an electric discharge device having a control electrode and a plurality of principal electrodes, means for impressing an alternating potential between said principal electrodes, a transformer comprising a magnetizable core, primary winding means and secondary winding means, means for impressing an alternating potential in synchronism with said first mentioned alternating potential on said primary winding means, means for connecting said secondary winding means between said control electrode and one of said principal electrodes, an auxiliary winding on said transformer and means for short circuiting said winding repeatedly during a number of half cycles of said first named alternating potential and open circuiting said winding during another number of half cycles of said first named alternating potential.

8. In combination an electric discharge device having a control electrode and a plurality of principal electrodes, means for impressing an alternating potential of relatively large magnitude between said principal electrodes, a transformer comprising a magnetizable core, primary winding means and secondary winding means, means for impressing an alternating potential in synchronism with said first mentioned alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

9. In combination an electric discharge device having a control electrode and a plurality of principal electrodes, means for impressing an alternating potential of the order of 10,000 volts between said principal electrodes, a transformer comprising a magnetizable core, primary winding means and secondary winding means, means for impressing an alternating potential in synchronism with said first mentioned alternating potential on said primary winding means, means for connecting said secondary winding means between said control electrode and one of said principal electrodes, an auxiliary winding on said transformer and means for short circuiting and open circuiting said auxiliary winding to vary the potential impressed between said control electrode and said one principal electrode.

10. In combination a plurality of electric discharge devices each having a control electrode and a plurality of principal electrodes and a transformer comprising a magnetizable core, a plurality of windings each of which is connected between a control electrode and a principal electrode of one of said discharge devices and an auxiliary winding to be short-circuited and open-circuited for varying the potential impressed by said first-named windings between the control electrodes and said principal electrodes of said discharge devices.

11. In combination a plurality of electric discharge devices each having a control electrode and a plurality of principal electrodes and a transformer comprising a magnetizable core, a plurality of windings each of which is connected between a control electrode and a principal electrode of one of said discharge devices and an auxiliary winding to be connected at will across a low electrical resistance and a high electrical resistance for varying the potential impressed by said first-named windings between the control electrodes and said principal electrodes of said discharge devices.

12. In combination a plurality of electric discharge devices each having a control electrode and a plurality of principal electrodes, means for impressing a high potential between the principal electrodes of each of said devices and a transformer comprising a magnetizable core, a plurality of windings each of which is connected between a control electrode and a principal electrode of one of said discharge devices and an auxiliary winding to be short-circuited and open-circuited for varying the potential impressed by said first-named windings between the control electrodes and said principal electrodes of said discharge devices.

13. For use in supplying a high direct current potential from an alternating current source to a load, the combination including a plurality of arc-like rectifiers each having an anode, a cathode and a control electrode connected in a Graetz square between said source and said load and a transformer having a magnetizable core, a plurality of secondary windings, each of which is connected between a control-electrode and a cathode of one of said rectifiers, and a control winding to be connected at will across a high resistance and a low resistance to increase and decrease respectively, the potential impressed between said control electrodes and cathodes.

14. In combination, an alternating current supply circuit, a load circuit, electric valve means for controlling the energization of said load circuit and comprising a control member for controlling the conductivity thereof, means for energizing said control member and comprising a saturable inductive device for impressing on said control member a periodic voltage of peaked wave form, means for energizing said inductive device during a predetermined interval of time to effect energization of said load circuit for a corresponding interval of time, and means for controlling the time of energization of said saturable device relative to the voltage of said alternating current circuit in order to prevent the establishment of a transient voltage in said inductive device.

15. In combination, an alternating current supply circuit, a load circuit, electric translating apparatus connected between said circuits and comprising electric valve means for controlling the energization of said load circuit, said electric valve means having a control member for controlling the conductivity thereof, a saturable inductive device energized from said supply circuit for impressing on said control member a periodic voltage of peaked wave form, means for energizing said saturable inductive device for a predetermined interval of time to effect energization of said load circuit during a corresponding interval of time, and means for initiating the energization of said inductive device at a time relative to the voltage of said alternating current circuit in order to prevent transient voltages in said inductive device.

16. In combination, an alternating current supply circuit, a load circuit electric translating apparatus connected between said circuits and comprising electric valve means for controlling the energization of said load circuit, said electric valve means including a control member for controlling the conductivity thereof, a saturable inductive device including a primary winding and having a secondary winding for impressing on said control member a periodic voltage of peaked wave form, means for energizing said primary winding to effect energization of said load circuit for a predetermined interval of time, and means connected to said primary winding for initiating energization of said primary winding at a time relative to the voltage of said supply circuit to prevent the establishment of transient voltages in said secondary winding.

17. In combination, an alternating current circuit, a saturable inductive device having a primary winding and a secondary winding in which there is induced a periodic voltage of peaked wave form, means for energizing said primary intermittently from said circuit to produce a predetermined number of impulses of voltage of peaked wave form, and means for initiating energization of said primary winding at a time relative to the voltage of said circuit to prevent the establishment of transient voltages in said secondary winding.

18. In combination, an alternating-current supply circuit, a load circuit, electric translating apparatus connected between said circuits and including an electric valve means for controlling the energization of said load circuit, said electric valve means having a control member for controlling the conductivity thereof, a saturable inductive device having a primary winding and having a secondary winding for impressing on said control member a periodic voltage of peaked wave form, and means comprising variable impedance means and a timing device coupled to said primary winding for effecting energization of said load circuit for a predetermined interval of time.

19. In combination, an alternating current circuit, a transformer comprising a magnetizable core member of the saturable type and including input winding means connected to be energized from said alternating current circuit and secondary winding means, and means for controlling said secondary winding means to control the output voltage of said secondary winding means in a manner to suppress transients occasioned by variations in the magnetization of said core member.

20. In combination, an alternating current circuit, a transformer comprising a magnetizable core member of the saturable type and including input winding means connected to be energized from said alternating current circuit and auxiliary winding means, and means for controlling said auxiliary winding means to control the output voltage of said transformer in a manner to suppress transients.

21. In combination an electric discharge device having a control electrode and a plurality of principal electrodes, a transformer comprising a magnetizable core, primary winding means and secondary winding means, means for impressing an alternating potential on said primary winding means, means for connecting said secondary winding means between said control electrode and one of said principal electrodes, an auxiliary winding on said transformer and means for varying the resistance in circuit with said auxiliary winding to vary the potential impressed between said control electrode and said one principal electrode.

22. In combination an electric discharge device having a control electrode and a plurality of principal electrodes, means for impressing an alternating potential between said principal electrodes, a transformer comprising a magnetizable core, primary winding means and secondary winding means, means for impressing an alternating potential in synchronism with said first mentioned alternating potential on said primary winding means, means for connecting said secondary winding means between said control electrode and one of said principal electrodes, an auxiliary winding on said transformer and means varying the resistance in circuit with said auxiliary winding to vary the potential impressed between said control electrode and said one principal electrode.

23. In combination an electric discharge device having a control electrode and a plurality of principal electrodes, a transformer having a readily saturable core and comprising primary winding means and secondary winding means, means for impressing an alternating potential on said primary winding means, means for connecting said secondary winding means between said control electrode and one of said principal electrodes, an auxiliary winding on said transformer and means for varying the resistance in circuit with said auxiliary winding to vary the potential impressed between said control electrode and said one principal electrode.

JOHN W. DAWSON.